United States Patent
Rump

[19]
[11] Patent Number: 5,979,619
[45] Date of Patent: Nov. 9, 1999

[54] METHOD AND SYSTEM FOR PREVENTING UNWANTED ROLLING AWAY OF A VEHICLE

[75] Inventor: Siegfried Rump, Weinstadt, Germany

[73] Assignee: DaimlerChrysler AG, Germany

[21] Appl. No.: 08/822,714

[22] Filed: Mar. 24, 1997

[30] Foreign Application Priority Data

Mar. 22, 1996 [DE] Germany .......................... 196 11 359

[51] Int. Cl.$^6$ .................................................. B60T 7/12
[52] U.S. Cl. .......................... 188/353; 188/265; 303/89; 303/191
[58] Field of Search .................................. 188/353, 265, 188/181 T; 303/89, 191, 192, 24.1, 113.1, 113.3, 114.3, 113.4, 119.1, 155, 3, DIG. 3, DIG. 4, 112; 477/182, 184, 198, 189, 901, 190, 194, 195, 196, 199, 186, 93, 114, 71; 192/13 A, 4 A, 219.1, 219.2; 701/1, 70

[56] References Cited

U.S. PATENT DOCUMENTS

| 3,645,352 | 2/1972 | Stark et al. ........................... 188/353 |
| 4,076,093 | 2/1978 | Mizuno .................................. 188/265 |
| 4,446,950 | 5/1984 | Wise et al. . | |
| 4,618,040 | 10/1986 | Honma et al. . | |
| 4,684,177 | 8/1987 | Ha . | |
| 4,708,406 | 11/1987 | Takagi et al. . | |
| 4,743,071 | 5/1988 | Iwamoto . | |
| 4,967,560 | 11/1990 | Konishi . | |
| 5,415,467 | 5/1995 | Utz et al. .................................. 303/89 |
| 5,452,946 | 9/1995 | Warner ................................... 303/24.1 |
| 5,646,841 | 7/1997 | Suzuki et al. ............................ 303/192 |
| 5,692,990 | 12/1997 | Tsukamoto et al. ..................... 477/901 |
| 5,741,200 | 4/1998 | Taniguchi et al. ...................... 477/901 |
| 5,791,750 | 8/1998 | Spiegelberg ............................ 303/901 |

FOREIGN PATENT DOCUMENTS

| 0 749 876 | 12/1996 | European Pat. Off. . |
| 29 11 372 A1 | 10/1980 | Germany . |
| 31 13 362 A1 | 10/1982 | Germany . |
| 91 10 658 | 12/1991 | Germany . |
| 42 03 541 | 6/1992 | Germany . |
| 43 32 459 | 3/1995 | Germany . |
| 8-142819 | 11/1994 | Japan . |

Primary Examiner—Douglas C. Butler
Attorney, Agent, or Firm—Evenson, McKeown, Edwards & Lenahan, P.L.L.C.

[57] ABSTRACT

A method for preventing unwanted rolling away of a stationary vehicle maintains a brake pressure in wheel brake cylinders. The brake pressure is maintained in dependence on the actuation of the brake pedal, and is maintained only if the current brake pressure exceeds a brake pressure corresponding to the holding pressure by a certain amount. This brake pressure can be applied at will by the driver.

14 Claims, 2 Drawing Sheets

METHOD AND SYSTEM FOR PREVENTING UNWANTED ROLLING AWAY OF A VEHICLE

BACKGROUND AND SUMMARY OF THE INVENTION

The present invention relates to a method and system for preventing unwanted rolling away of a vehicle, and more particularly, to a method in which rolling away is prevented by maintaining a brake pressure in wheel brake cylinders, and the brake pressure maintained being dependent on the actuation of the brake pedal, the speed of the vehicle being determined.

DE 29 11 372 discloses a brake system which has a rotational-speed detection system which is linked to the direction of rotation and actuates the brakes if the vehicle starts to roll in the opposite direction to the direction of the gear selected, i.e. rolling backwards when a forward gear has been selected and vice versa. When the brake system is deactivated, the pressure dissipation takes place as a function, inter alia, of the engine speed. Owing to the system configuration, triggering the brake actuation requires an engaged gear. No brake actuation takes place at idle. Moreover, the driver has no influence on the triggering of brake actuation.

DE 031 13 362 discloses that the ignition and the brakes can be coupled to ensure that the brakes are automatically actuated when the vehicle is parked.

An object on which the invention is based is to provide a system which prevents a stationary vehicle from unintended movement and which can be activated at will by the driver.

According to the present invention, this object has been achieved by providing that a variable which represents the actuating force applied by the driver is detected, a first value of the variable being determined in a first time interval following the onset of the stationary condition of the vehicle and, when the current value of the variable exceeds a second value of the variable, which is higher by a predetermined amount than the first value, at least the brake pressure which corresponds to an actuation of the brake pedal with the first value of the variable is maintained irrespective of a subsequent release of the brake pedal.

The system of the present invention has the advantage that, when the vehicle is stationary, brakes are actuated only if the brake pedal has been actuated. The brake system is triggered by the driver by an additional actuation of the brake pedal. This has the advantage, as compared with the conventional approach, that the system can be controlled at will by the driver.

A further advantage of the present invention is that components of the existing ABS can be used. The system furthermore remains activated when the idling speed has been selected to facilitate, among other things, parking.

According to another embodiment of the invention, a signal from the ignition is detected and, if the engine stalls but the ignition is still switched on, braking force is maintained to ensure that the vehicle does not roll away. Moreover, the brake pressure does not necessarily have to be dissipated when the ignition is off because, otherwise, the vehicle would roll away when the driver restarted the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
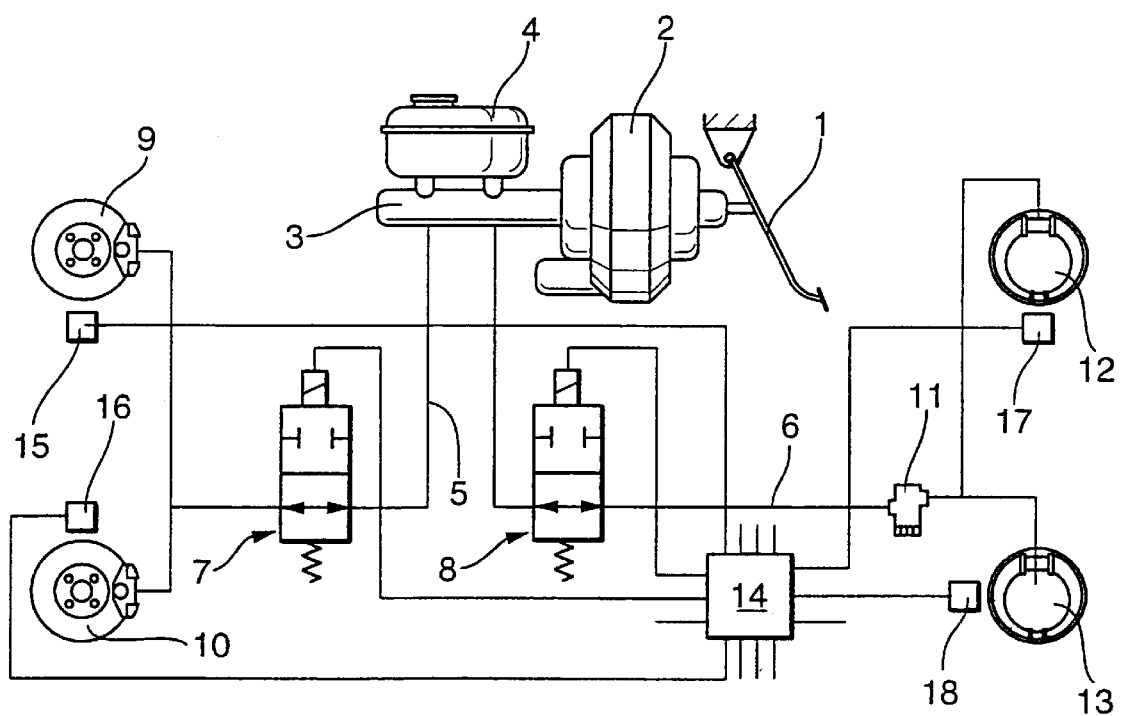
FIG. 1 is a schematic view of a hydraulic brake system using the principles of the present invention.

FIG. 1 illustrates a hydraulic brake system having a brake pedal 1 which is connected to the master cylinder 3 by way of a vacuum brake booster 2. The brake fluid reservoir 4 is connected to the master cylinder 3 by two fluid connections. The brake system is divided into two circuits, only one axle being braked in each circuit 5, 6. A respective shut-off valve 7, 8 for maintaining the brake pressure is arranged in each circuit.

The first circuit 5 for the front axle is divided, with each branch leading to one brake disc 9, 10. A brake-power regulator 11 is arranged in the second circuit, downstream of the shut-off valve 8. The second circuit also divides into two following the brake-power regulator 11, with each branch leading to a drum brake 12, 13.

The brake system described operates in a conventional manner i.e. an actuating force F1 is applied to the pedal. This force F1 is intensified by means of a lever action (F2) and then further intensified by the brake booster (F3). Together with the cross-sectional area of the tappet of the brake master cylinder, this force F3 determines the brake pressure.

The shut-off valves 7, 8 serve to maintain the brake pressure when the actuating force is no longer being applied to the brake pedal. The shut-off valves 7, 8 are driven by a control unit 14, the action of which will be described in greater detail below. In the unactuated state of the shut-off valves 7, 8, the wheel brake cylinders are fluidically connected to the brake master cylinder 3.

Figure 2:
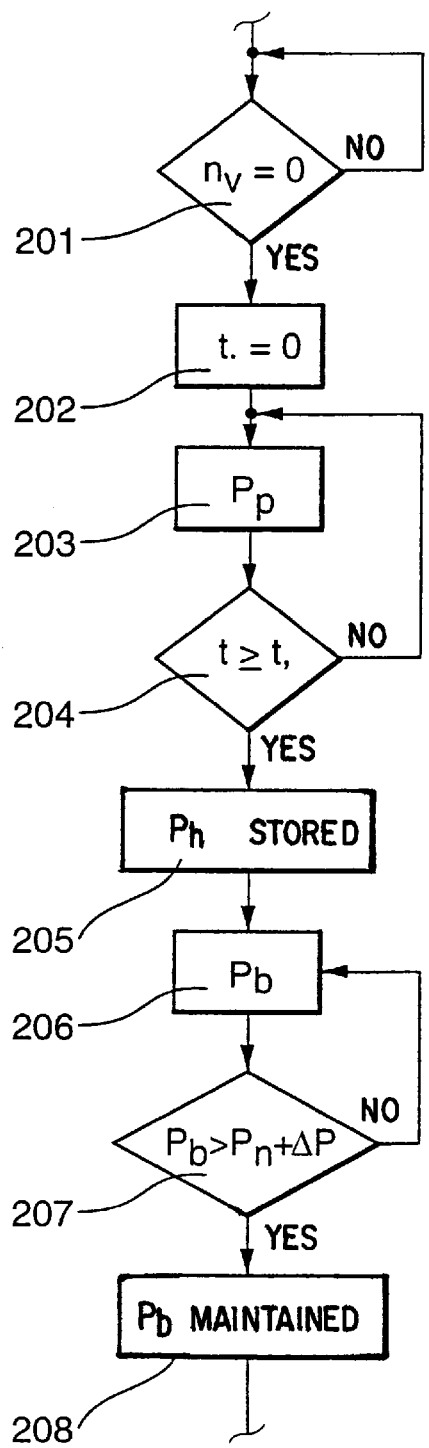
FIG. 2 is a flow diagram of a method according to the invention.

FIG. 2 shows a flow diagram which illustrates the individual steps of a method according to the invention for preventing a vehicle from rolling away.

Step 201, the wheel speed $n_v$ is detected by wheel-speed sensors 15, 16, 17, 18. If the wheel speed $n_v$ is not equal to zero, i.e. the vehicle is not stationary, the method is not started and the brakes are controlled exclusively by the driver. If the wheel speed is equal to zero and the vehicle is thus stationary, then, in Step 202, a first time interval t1, for example t1=0.2 s, is begun, over which time interval the current brake pressure $P_b$ is determined in Step 203. In Step 204, the system using, for example, conventional data processing technology determines whether or not the time interval t1 has expired. If the interval t1 has not expired, the current brake pressure $P_b$ continues to be determined. The brake pressure $P_b$ corresponds to the brake pressure required to hold the vehicle stationary (the holding pressure $P_h$). Once the time t1 has expired, the maximum value determined for the brake pressure $P_b$, i.e. $P_h$, is stored in a logic unit of a microprocessor or the like in accordance with Step 205. The status in Step 205 represents the starting position for the method according to the invention.

Step 206, the current brake pressure $P_b$ continues to be detected. In order to begin the prevention of rolling away, the driver must actuate the brake pedal with a greater force. In Step 207, the current brake pressure $P_b$ is compared with the holding pressure $P_h$. If the current brake pressure does not exceed the holding pressure by a predetermined amount, for example 10 bar, the current brake pressure continues to be detected and compared with the holding pressure $P_h$ in Step 206. If the current braking value $P_b$ exceeds the holding pressure $P_h$ by a predetermined amount, then, in accordance with Step 208, the shut-off valves are closed, and the holding pressure $P_h$ or the current pressure are thus maintained.

Figure 3:
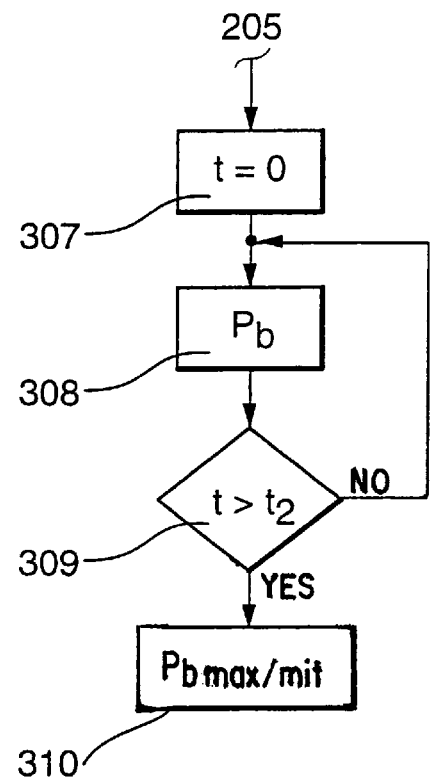
FIG. 3 is a flow diagram of an alternative embodiment of the method.

FIG. 3 represents an alternative sequence of the method to that in Steps 207 and 208 of FIG. 2.

In Step 307, a second time interval t2 is begun, where t2=0.1 s for example. In Step 308, the current brake pressure is determined over the time interval t2. Once the time interval t2 has expired in Step 309, the brake pressure is raised, in Step 310, either to the maximum value $P_{bmax}$ of the current brake pressure during the time interval t2 or to the average value $P_{bmit}$ of the current brake pressure, and the vehicle is thereby held.

Figure 4:
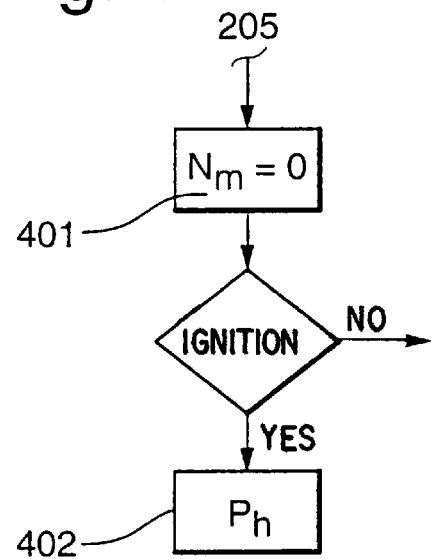
FIG. 4 is a flow diagram of another embodiment of the method according to the invention, with the position of the ignition switch being taken into account.

FIG. 4 shows a preferred configuration of the method, wherein the position of the ignition switch is determined and the maintenance of the brake pressure is dependent on this position.

The following steps are inserted in the method of FIG. 4 after Step 205 of FIG. 2.

In Step 401, the engine speed $N_m$ is determined. If the engine speed is not equal to zero and the vehicle is stationary, the method is continued with step 206. If the engine speed is equal to zero, the system determines whether or not the ignition is switched on. If the ignition is switched on and the engine speed is equal to zero, the driver has stalled the engine. In Step 402, the previously stored holding pressure $P_h$ is applied in order to prevent the vehicle from rolling away. The method then returns to Step 206 to ensure that the driver can increase the current brake pressure if this is required. If the ignition is switched off and the engine speed is equal to zero, the vehicle is parked. Here, the holding pressure $P_h$ could be applied in the already conventional manner.

According to another embodiment of the present invention, the position of the parking brake is continuously determined after Step 205. If the parking brake is operated or released, the holding pressure $P_h$ is dissipated, allowing the system to be relieved. If the holding pressure is dissipated, for example after operation of the parking brake or the accelerator pedal, this takes place progressively as a function of the position of the clutch pedal and/or the engine torque.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for preventing unwanted rolling away of a stationary vehicle on an inclined surface, comprising the steps of detecting a variable which represents a brake pedal actuating force applied by a driver, determining a first value of the variable in a first time interval following an onset of a vehicle stationary condition, determining a second value of the variable which is higher by a predetermined amount than the first value, and maintaining independently of a subsequent brake pedal release by the driver, when a current value of the variable exceeds the second value, at least the brake pressure which corresponds to the brake pedal actuation with the first value to keep the vehicle in the stationary condition until the driver inputs a signal to resume movement of the stationary vehicle.

2. The method according to claim 1, wherein the brake pressure maintained is at least as great as the brake pressure corresponding to the first value.

3. The method according to claim 1, wherein the brake pressure maintained is at least as great as the brake pressure corresponding to the second value.

4. The method according to claim 3, wherein the brake pressure maintained corresponds to the brake pressure corresponding to a pedal actuation force greater than the second value.

5. The method according to claim 1, wherein the brake pressure maintained corresponds to a maximum value for the actuating force determined over a time interval.

6. The method according to claim 1, wherein the brake pressure maintained corresponds to the average of the actuating force determined over a time interval.

7. The method according to claim 1, further comprising the steps of detecting a signal corresponding to a position of an ignition switch, and maintaining the brake pressure only when the ignition is switched on.

8. The method according to claim 7, further comprising the step of detecting engine speed, and maintaining a brake pressure when the engine speed is zero.

9. The method according to claim 1, further comprising the steps of detecting a signal corresponding to a position of a parking brake, and dissipating the brake pressure when the parking brake is actuated.

10. A system for preventing unwanted rolling away of a stationary vehicle on an inclined surface, comprising means for detecting a variable which represents a brake pedal actuating force applied by a driver; means for determining a first value of the variable in a first time interval following an onset of a vehicle stationary condition; means for determining a second value of the variable which is higher by a predetermined amount than the first value; and means for maintaining independently of a subsequent release of the brake pedal by the driver, at least the brake pressure which corresponds to the brake pedal actuation with the first value when a current value of the variable exceeds the second value to keep the vehicle in the stationary condition until the driver inputs a signal to resume movement of the stationary vehicle.

11. Method for preventing rolling away of a vehicle on an inclined surface, comprising the steps of manually applying a first braking force to a vehicle brake pedal to bring the vehicle to a stop condition on the inclined surface; establishing a time interval after the vehicle is brought to the stop condition, at the end of which first time interval a holding brake pressure required to hold the vehicle in the stop condition is determined; manually applying a second braking force greater than the first braking force to the brake pedal such that, when a current braking pressure exceeds the holding brake pressure by a predetermined amount, one of the holding brake pressure or the current brake pressure is maintained without the manual application of any braking force to the brake pedal to keep the vehicle in the stop condition on the inclined surface; and progressively reducing the holding brake pressure or current brake pressure to zero upon inputting a signal representative of a driver's desire to resume movement of the vehicle.

12. The method according to claim 11, further comprising the steps of detecting a signal corresponding to a position of an ignition switch, and maintaining a brake pressure at least equal to the holding brake pressure only when the ignition is switched on.

13. The method according to claim 12, further comprising the step of detecting engine speed and maintaining the brake pressure at least equal to the holding brake pressure when the engine speed is zero.

14. The method according to claim 11, wherein the step of progressive reduction occurs upon detecting a parking brake position signal.

* * * * *